Jan. 7, 1958

E. TOTH 2,819,400

F.M. TUNING INDICATOR

Filed Oct. 28, 1955

2 Sheets-Sheet 1

INVENTOR
EMERICK TOTH

BY W R Maltby
Edward W. White
ATTORNEYS

Jan. 7, 1958

E. TOTH 2,819,400

F.M. TUNING INDICATOR

Filed Oct. 28, 1955

2 Sheets-Sheet 2

INVENTOR
EMERICK TOTH

BY W R Maltby
Osborne & White ATTORNEYS 2,819,400

Patented Jan. 7, 1958

2,819,400

F. M. TUNING INDICATOR

Emerick Toth, Takoma Park, Md.

Application October 28, 1955, Serial No. 543,633

7 Claims. (Cl. 250—40)

(Granted under Title 35, U. S. Code (1952), sec. 266)

The invention described herein may be manufactured and used by or for the Government of the United States of America for governmental purposes without the payment of any royalties thereon or therefor.

This invention relates in general to frequency modulation receiving means and in particular to an improved "on-off" frequency indicating means.

As is well known, oscillator frequency drift, which necessitates a retuning of the receiver, represents a serious problem in basic frequency modulation receivers. Various circuit ramifications have been devised in answer to this oscillator drift problem but in general the additional circuitry required is prohibitive in the smaller and less expensive F. M. receivers. To alleviate the problem of retuning the receiver to correct for a frequency deviation, means for indicating when the receiver is directly tuned to the desired station, such as conventional meters or "magic eye" devices, are available but these are, in general, either expensive or relatively insensitive to small variations in frequency. It will be seen that an inexpensive, positive acting, "on-off" frequency indicating means for FM receivers which is sensitive to the slightest frequency drift is highly desirable. Accordingly:

It is an object of this invention to provide a relatively inexpensive "on-off" frequency indicating means for use in tuning a frequency modulation receiver.

It is a further object of this invention to provide a cold lamp type frequency indicating means for FM receivers which affords a positive indication when the receiver begins to drift from the desired frequency.

It is still another object of this invention to provide a simple, compact, and highly sensitive means for indicating a frequency drift.

Other objects of this invention will become apparent upon a thorough understanding of the invention for which reference is had to the following drawings and description of the invention.

Briefly, the device of this invention constitutes a neon lamp type indicating means and associated circuitry connected in parallel with the output of the discriminator in an FM receiver such that the neon lamp is responsive to an unbalanced condition in the discriminator. Preferably, the neon lamp is extinguished when the receiver is tuned to the desired frequency and lights when the receiver begins to drift.

Figure 1:
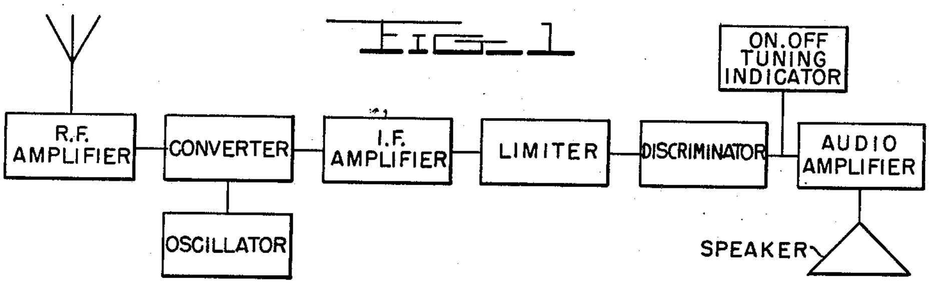
Fig. 1 is a showing in block diagram of a basic frequency modulation receiver employing the indicating means of this invention.

In Fig. 1 a typical frequency modulation receiver, adapted in accordance with this invention, is shown in block diagram to demonstrate the connection of the "on-off" tuning indicator at the output of the discriminator.

Figure 2:
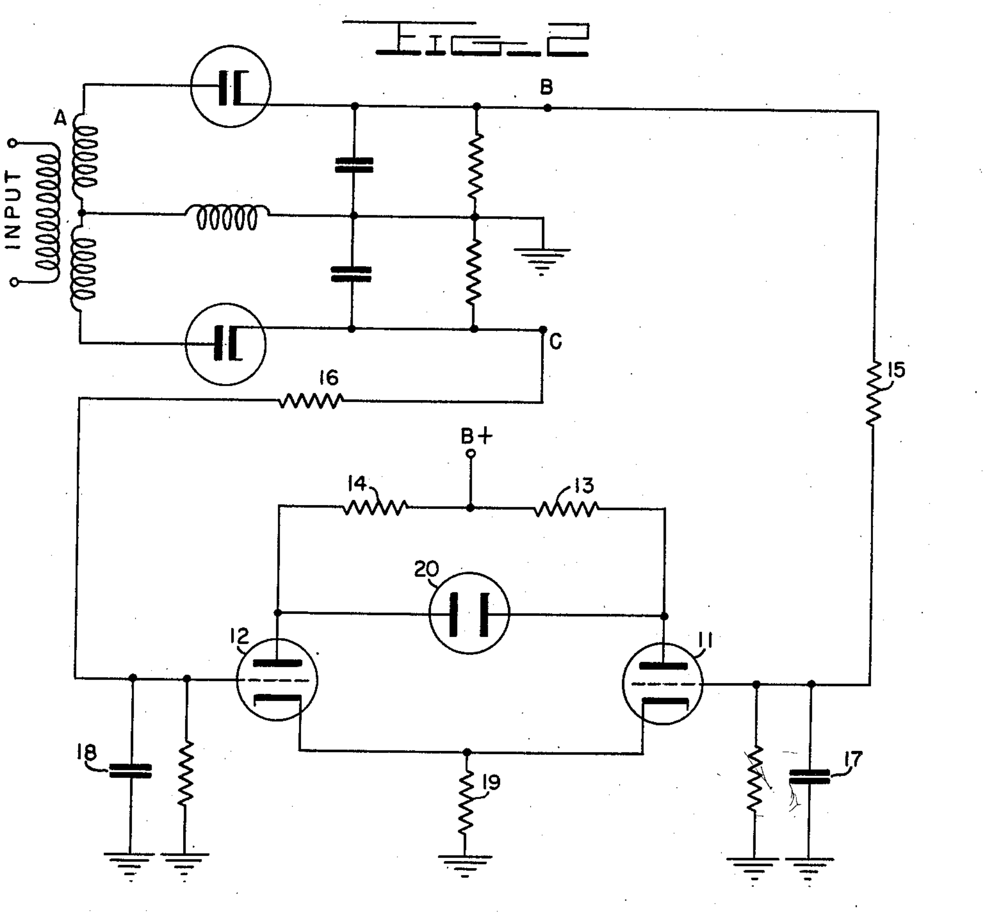
Fig. 2 is a schematic showing of one embodiment of this invention.

In Fig. 2, a first embodiment of the indicating means of this invention is shown. As is standard practice in FM discriminators of the Foster Seeley type depicted, a constant amplitude signal from the previous limiter stage is applied via input transformer A to the discriminator. The output of this balanced voltage discriminator is taken across the terminals B and C and it will be seen that the magnitude of voltage with respect to ground at these terminals will be equal when the receiver is tuned to the desired frequency.

The terminals, B and C, are connected to the grid in triodes 11 and 12, respectively. The plates of said triodes 11 and 12 are connected to a common potential source via load resistors 13 and 14, respectively, and the cathodes are connected via cathode resistance 19 to ground. As will be seen, it is not essential that the two triodes in this embodiment react on one another and it is therefore not essential that the cathodes be commonly connected. A two terminal neon lamp 20 is connected between the plates of the two triodes. Thus when the voltages at the terminals B and C are not the same, the plate current through the two triodes and their plate voltages will be altered proportionately to produce a voltage difference across the neon lamp. When this voltage difference is sufficient, the neon lamp will light on one element or the other depending on the direction of frequency deviation. It will be seen that by using a biased neon lamp, wherein the gas is partially ionized, a lower firing potential is required to light the lamp and the impedance of the plate load resistance may be reduced.

Filter networks, resistance 15, capacitance 17, and resistance 16, capacitance 18 are provided between the discriminator output terminals and the grids of triodes 11 and 12, respectively. These filter networks are characterized by long time constants and prevent the neon lamp from flickering when the carrier is modulated.

Figures 3, 4:
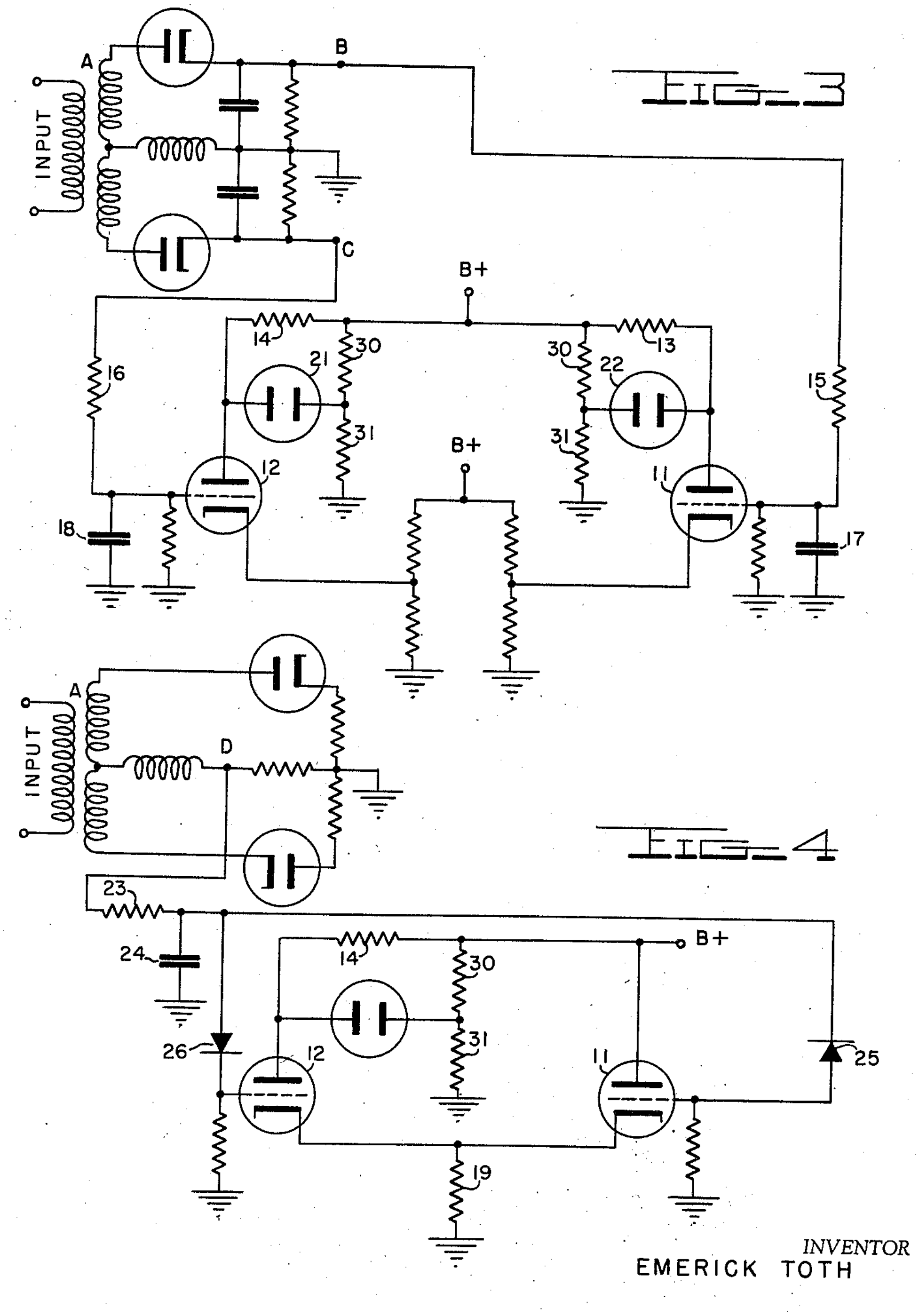
Fig. 3 is a schematic showing of another embodiment of this invention.
Fig. 4 is a schematic showing of still another embodiment of this invention.

In Fig. 3 a more elaborate embodiment of this invention is shown connected to the output of a Foster Seeley discriminator of the type described in Fig. 2. It will be seen that this embodiment is substantially similar to that of Fig. 2 and that the tube current, likewise the plate voltage, of the triodes 11 and 12 will vary in accordance with the magnitude of the voltage at the terminals C and B, respectively. In this particular embodiment, however, two neon lamps 21 and 22, one of which indicates a frequency drift in one direction and the other indicates a frequency drift in the opposite direction, are provided. In specific description of this embodiment, each neon lamp is connected between the plate of its respective triode and a voltage source which provides an initial bias. In the figure the connections are made to two separate voltage sources, which are shown as identical bleeder circuits, resistances 30 and 31 in series. It is understood, of course, that the two neon lamps might be connected to a single voltage source, if desired. A particular advantage of this second embodiment is the two lamps may be separated to provide a positive indication, at a glance, of the direction of frequency deviation.

Fig. 4 shows still another embodiment of this invention wherein the frequency deviation indicating means is connected to a balanced current type FM discriminator (e. g., ratio detector). In this embodiment the discriminator output at D, which may be a positive or a negative voltage depending on the direction of deviation from the desired frequency, is connected through the filter circuits, resistance 23 and capacitance 24, and through oppositely polarized unidirectional conductive elements, 25 and 26, to the grid of the triodes 11 and 12 respectively.

A neon lamp is connected between the plate of triode 12 and the mid-point of the bleeder circuits, resistances 30 and 31. A plate load resistance 14 is connected between the plate of the triode 12 and B+. And the cathodes of the two triodes 11 and 12 are connected through a common cathode resistance to ground.

In operational analysis of this embodiment, with zero voltage output from the discriminator there is maximum plate current in tube 12 and the neon lamp is out. A negative discriminator output voltage, indicative of a frequency deviation in one direction, increases the negative bias on the grid of tube 12 which reduces its plate current. By reducing this plate current, the voltage drop across the plate load resistance 14 is reduced and the plate voltage approaches the maximum voltage, B+. Thus, the voltage across the neon lamp approaches the magnitude of voltage across the resistance 30 in the bleeder circuit. When the firing potential of the neon lamp is reached the lamp lights to indicate a frequency deviation.

In a somewhat inverse manner, a positive discriminator output voltage, indicative of a frequency deviation in the opposite deviation, increases the bias on the grid of tube 11 which increases its plate current. Thus the voltage drop across the common cathode resistance 19 is increased and the effective grid bias on the triode 12 becomes more negative and lights the neon lamp, in the manner described above.

In this embodiment the filter network, resistance 23, capacitance 24, serves a twofold purpose. In addition to preventing the neon lamp from flickering when the carrier is modulated, this network also prevents the unidirectional elements, 26 and 28, from causing distortion by a variable loading of the discriminator.

In addition to its function as a positive action frequency deviation indicating means, the device of this invention may be utilized to advantage in tuning the receiver to a desired station. For example, when the broadcasting station is transmitting an unmodulated carrier, or when "silent tuning" is preferred, the station may be tuned in by adjusting the dial for the approximate frequency and then employing the "light-no light-light" indication for the fine tuning adjustment.

While the embodiments of Figs. 3 and 4 have included bleeder type voltage sources, which insure a substantially constant initial voltage, it is understood, of course, that other types of regulated voltage sources might readily be employed by these embodiments. It should also be understood it is within the purview of this invention that other types of current controlling elements may be substituted for the triodes 11 and 12.

Finally it is understood that this invention is not to be restricted to the specific embodiments exemplarily shown in the drawings but that the invention is to be limited only by the scope of the claims appended hereto.

What is claimed is:

1. An on-off frequency indicating means for FM receivers having a discriminator whose output voltage is varient about a point of zero potential in accordance with the frequency deviation from a desired carrier frequency comprising; a voltage source, first current controlling means, first impedance means connected to said voltage source and in series with said first current controlling means, second current controlling means, means connecting said second current controlling means to said voltage source, a third impedance means, means commonly connecting said first and second current controlling means in series with said third impedance means, means connecting said third impedance means to said voltage source such that each of said current controlling means is connected across said voltage source, a neon lamp type means connected to said voltage source and to the junction of said first impedance means and said first current controlling means such that said lamp means is visually responsive to a change in voltage at said junction, first and second oppositely polarized unidirectional elements connecting the output of said discriminator to said first and second current controlling means, respectively, to control the current in said current controlling means in accordance with the polarity of said discriminator output.

2. An on-off frequency indicating means for FM receivers having a discriminator whose output voltage is varient about a point of zero potential in accordance with the frequency deviation from a desired carrier frequency comprising; a voltage source, first current controlling means, first impedance means connected to said voltage source and in series with said first current controlling means, second current controlling means, means connecting said second current controlling means to said voltage source, a third impedance means, means commonly connecting said first and second current controlling means in series with said third impedance means, means connecting said third impedance means to said voltage source such that each of said current controlling means is connected across said voltage source, a neon lamp means connected to said voltage source and to the junction of said first impedance means and said first current controlling means such that said lamp means is visually responsive to a change in voltage at said junction, first and second oppositely polarized unidirectional elements connecting the output of said discriminator to first and second current controlling means, respectively, such that an output voltage of either polarity will decrease the current passing through said first current controlling means.

3. An on-off frequency indicating means for FM receivers having a discriminator whose output voltage is varient about a point of zero potential in accordance with the frequency deviation from a desired carrier frequency comprising; a voltage source, first current controlling means, first impedance means connected to said voltage source and in series with said first current controlling means, second current controlling means, means connecting said second current controlling means to said voltage source, a third impedance means, means commonly connecting said first and second current controlling means in series with said third impedance means, means connecting said third impedance means to said voltage source such that each of said current controlling means is connected across said voltage source, a neon lamp type means connected to said voltage source and to the junction of said first impedance means and said first current controlling means such that said lamp means is visually responsive to a change in voltage at said junction, first and second oppositely polarized unidirectional elements connecting the output of said discriminator to said first and second current controlling means, respectively, such that an output voltage of negative polarity decreases the current passing through said first current controlling means and an output voltage of positive polarity increases the current passing through said second current controlling means.

4. An on-off frequency indicating means for FM receivers having a discriminator whose output voltage is varient about a point of zero potential in accordance with the frequency deviation from a desired carrier frequency comprising; a voltage source, first vacuum tube means having a plate, a cathode and at least one grid, first impedance means connected to said voltage source and to the plate in said vacuum tube means, second vacuum tube means having a plate, a cathode and at least one grid, means connecting said second vacuum tube means to said voltage source, a third impedance means, means commonly connecting the cathodes in said first and second vacuum tube means in series with said third impedance means, means connecting said third impedance means to said voltage source such that each of said vacuum tube means is connected across said voltage source, a neon lamp type means connected to said voltage source and to the plate of said first vacuum tube means such that said lamp means is visually responsive to a change in voltage at the plate of said first vacuum tube means, first and second oppositely polarized unidirectional elements connecting the output of said discriminator to a control grid in said first and second vacuum tube means, respectively, to control the current in said vacuum tube means in accordance with the polarity of said discriminator output.

5. An on-off frequency indicating means for FM receivers having a discriminator whose output voltage is varient about a point of zero potential in accordance with the frequency deviation from a desired carrier frequency comprising; a voltage source, first vacuum tube means having a plate, a cathode and at least one grid, first impedance means connected to said voltage source and to the plate in said first vacuum tube means, a second vacuum tube means having a plate, a cathode and at least one grid, means connecting the plate in said second vacuum tube means to said voltage source, a third impedance means, means commonly connecting the cathodes in said first and second vacuum tube means in series with said third impedance means, means connecting said third impedance means to said voltage source such that each of said vacuum tube means is connected across said voltage source, a neon lamp type means connected to said voltage source and to the plate of said first vacuum tube means such that said lamp means is visually responsive to a change in voltage at the plate of said first vacuum tube means, first and second oppositely polarized unidirectional elements connecting the output of said discriminator to a control grid in said first and second vacuum tube means, respectively, such than an output voltage of either polarity will decrease the current passing through said first vacuum tube means.

6. An on-off frequency indicating means for FM receivers having a discriminator whose output voltage is varient about a point of zero potential in accordance with the frequency deviation from a desired carrier frequency comprising; a voltage source, first vacuum tube means having a plate, a cathode and at least one grid, first impedance means connected to said voltage source and to the plate in said first vacuum tube means, second vacuum tube means having a plate, a cathode and at least one grid, means connecting the plate in said second vacuum tube means to said voltage source, a third impedance means, means commonly connecting the cathodes in said first and second vacuum tube means in series with said third impedance means, means connecting said third impedance means to said voltage source such that each of said vacuum tube means is connected across said voltage source, a neon lamp type means connected to said voltage source and to the plate of said first vacuum tube means such that said lamp means is visually responsive to a change in voltage at the plate of said first vacuum tube means, first and second oppositely polarized unidirectional elements connecting the output of said discriminator to a control grid in said first and second vacuum tube means, respectively, such that an output voltage of negative polarity decreases the current passing through said first vacuum tube means and an output voltage of positive polarity increases the current passing through said second vacuum tube means.

7. A warning means for indicating when a voltage of either positive or negative polarity appears at a terminal of normally zero potential which comprises, a voltage source, first current controlling means, first impedance means connected to said voltage source and in series with said first current controlling means, second current controlling means, means connecting said second current controlling means to said voltage source, a third impedance means, means commonly connecting said first and second current controlling means in series with said third impedance means, means connecting said third impedance means to said voltage source such that each of said current controlling means is connected across said voltage source, a neon lamp type means connected to said voltage source and to the junction of said first impedance means and said first current controlling means such that said lamp means is visually responsive to a change in voltage at said junction, first and second oppositely polarized unidirectional elements connecting said terminal to said first and second current controlling means, respectively, to control the current in said current controlling means in accordance with the polarity of said terminal.

References Cited in the file of this patent

UNITED STATES PATENTS 2,390,481 Summerhayes ---------- Jan. 26, 1943

OTHER REFERENCES

"Equipment Report," Audio Engineering, January 1953, vol. 37, No. 1, p. 56.